US010359601B2

(12) United States Patent
Cheng et al.

(10) Patent No.: US 10,359,601 B2
(45) Date of Patent: Jul. 23, 2019

(54) SURVEILLANCE SYSTEM AND SURVEILLANCE DEVICE

(71) Applicant: VIVOTEK INC., New Taipei (TW)

(72) Inventors: Szu-Hsing Cheng, New Taipei (TW); Chih-Hao Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 23 days.

(21) Appl. No.: 15/917,843

(22) Filed: Mar. 12, 2018

(65) Prior Publication Data

US 2018/0275366 A1    Sep. 27, 2018

(30) Foreign Application Priority Data

Mar. 21, 2017    (TW) .............................. 106109288 A

(51) Int. Cl.
*G02B 7/02* (2006.01)
*H04N 7/18* (2006.01)
*H04N 5/225* (2006.01)

(52) U.S. Cl.
CPC ........... *G02B 7/023* (2013.01); *H04N 5/2252* (2013.01); *H04N 5/2257* (2013.01); *H04N 7/181* (2013.01)

(58) Field of Classification Search
CPC . G02B 7/023; G02B 7/08; G02B 7/04; G02B 7/102; H02K 41/0356
USPC ......................................................... 359/822
See application file for complete search history.

(56) References Cited

U.S. PATENT DOCUMENTS

| 7,202,904 | B2 * | 4/2007 | Wei ........................ F16M 11/10 |
| | | | 348/14.05 |
| 2010/0157052 | A1 * | 6/2010 | Chang ................. H04N 5/23241 |
| | | | 348/143 |

FOREIGN PATENT DOCUMENTS

| CN | 204284864 U | 4/2015 |
| JP | 2002311495 | 10/2002 |
| TW | 200831883 | 8/2008 |

* cited by examiner

*Primary Examiner* — Mohammed A Hasan
(74) *Attorney, Agent, or Firm* — Winston Hsu

(57) ABSTRACT

A surveillance system includes a ring-shaped track, a first support frame, at least one first roller, at least one second roller and a lens module. The ring-shaped track has an outside flanged portion and an inside flanged portion. The at least one first roller is disposed on the first support frame and leans against the outside flanged portion. The at least one second roller is disposed on the first support frame and leans against the inside flanged portion, such that the ring-shaped track is sandwiched in between the at least one first roller and the at least one second roller. The lens module is disposed on the first support frame.

12 Claims, 16 Drawing Sheets

SURVEILLANCE SYSTEM AND SURVEILLANCE DEVICE

BACKGROUND OF THE INVENTION

1. Field of the Invention

The invention relates to a surveillance system and a surveillance device and, more particularly, to a surveillance system and a surveillance device capable of adjusting a lens orientation conveniently and rapidly.

2. Description of the Prior Art

Since safety awareness is being raised gradually, people pay much attention to safety surveillance application. So far in many public or non-public places, there are always one or more cameras installed for safety surveillance. When a lens orientation of a camera does not coincide with a surveillance orientation desired by a user, the user has to adjust the lens orientation to coincide with the surveillance orientation. Currently, an adjusting mechanism of a conventional lens is complicated and not easy to be operated. Accordingly, it is inconvenient to adjust the lens orientation.

SUMMARY OF THE INVENTION

An objective of the invention is to provide a surveillance system and a surveillance device capable of adjusting a lens orientation conveniently and rapidly, so as to solve the aforesaid problems.

According to an embodiment of the invention, a surveillance system comprises a ring-shaped track, a first support frame, at least one first roller, at least one second roller and a lens module. The ring-shaped track has an outside flanged portion and an inside flanged portion. The at least one first roller is disposed on the first support frame and leans against the outside flanged portion. The at least one second roller is disposed on the first support frame and leans against the inside flanged portion, such that the ring-shaped track is sandwiched in between the at least one first roller and the at least one second roller. The lens module is disposed on the first support frame.

According to another embodiment of the invention, a surveillance device comprises a first support frame, a second support frame and a lens module. The first support frame has a first recess structure. The second support frame is disposed on the first support frame and configured to rotate with respect to a first axis. The second support frame has a second recess structure. The lens module is disposed on the second support frame and configured to rotate with respect to a second axis, wherein the first axis is perpendicular to the second axis. The lens module has a protruding structure. The protruding structure is configured to get in and out of the first recess structure and the second recess structure when the second support frame or the lens module rotates.

As mentioned in the above, the first support frame can move along the ring-shaped track by the first roller and the second roller, such that the lens module moves with the first support frame along the ring-shaped track. Furthermore, the second support frame can rotate with respect to the first support frame, such that the lens module rotates with the second support frame with respect to the first support frame. Moreover, the lens module can rotate with respect to the second support frame. By means of the aforesaid mechanism, a user can adjust the lens orientation conveniently and rapidly to satisfy different requirements of surveillance orientations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
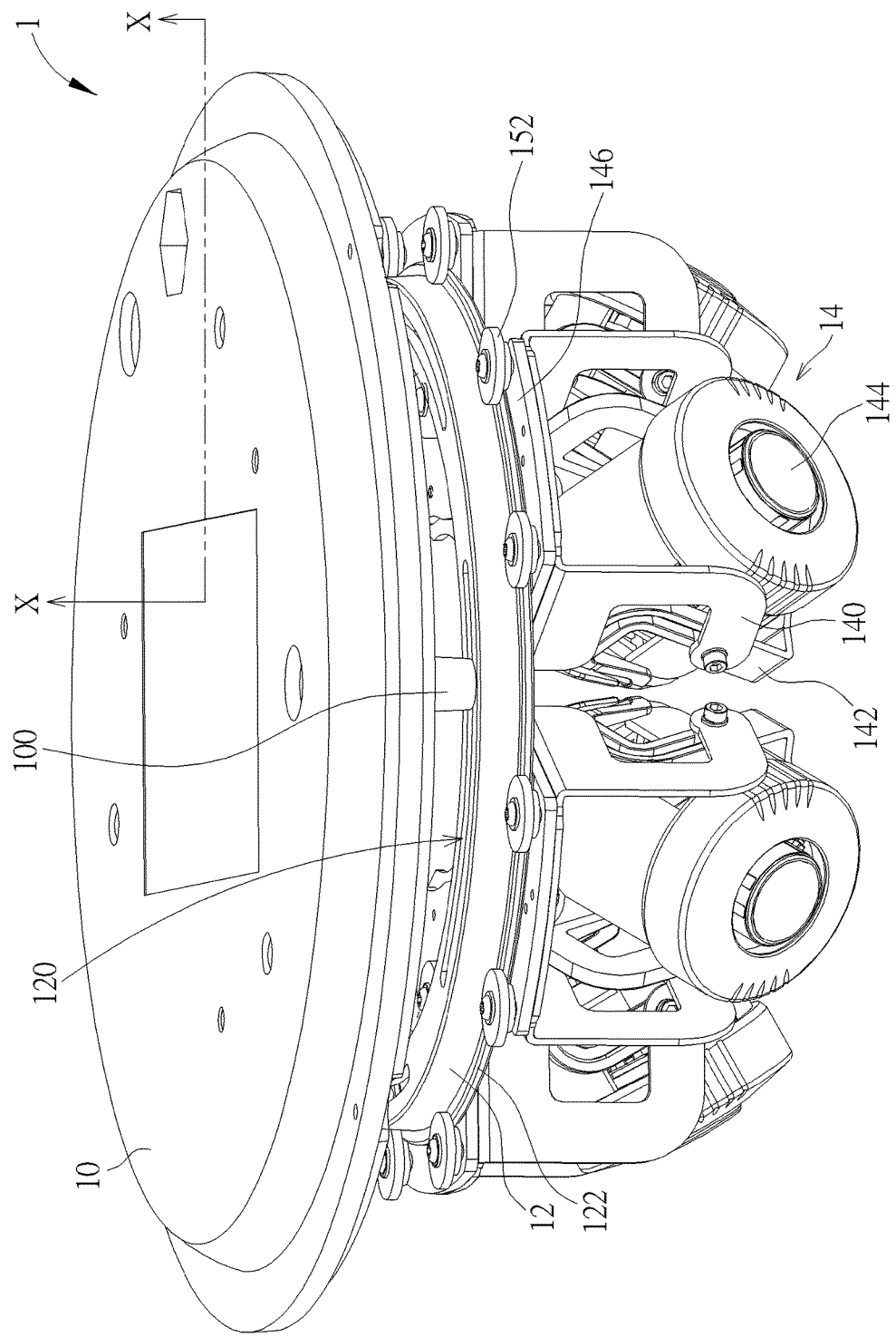
FIG. 1 is a perspective view illustrating a surveillance system according to an embodiment of the invention.
Figure 2:
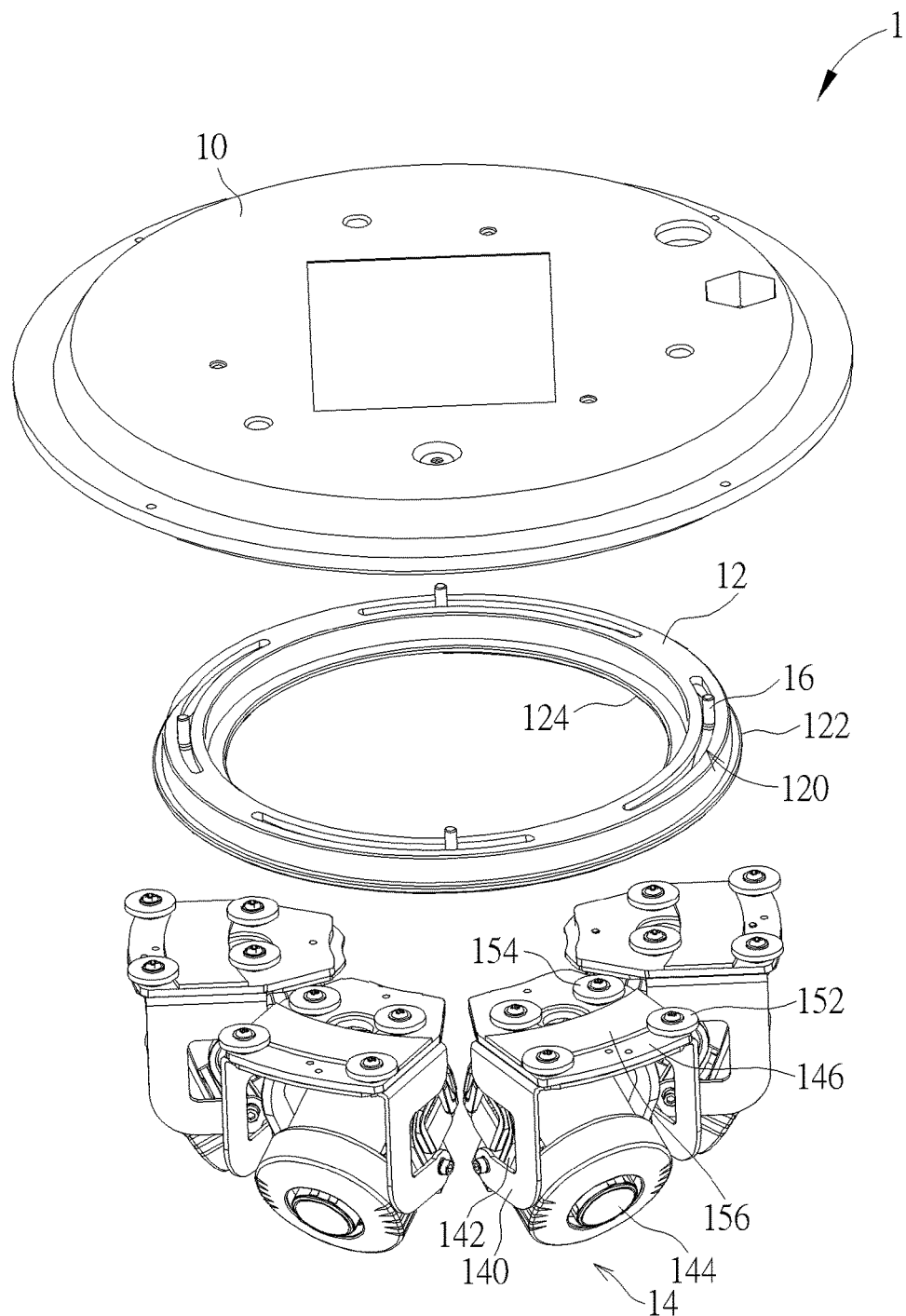
FIG. 2 is an exploded view illustrating the surveillance system shown in FIG. 1.
Figure 3:
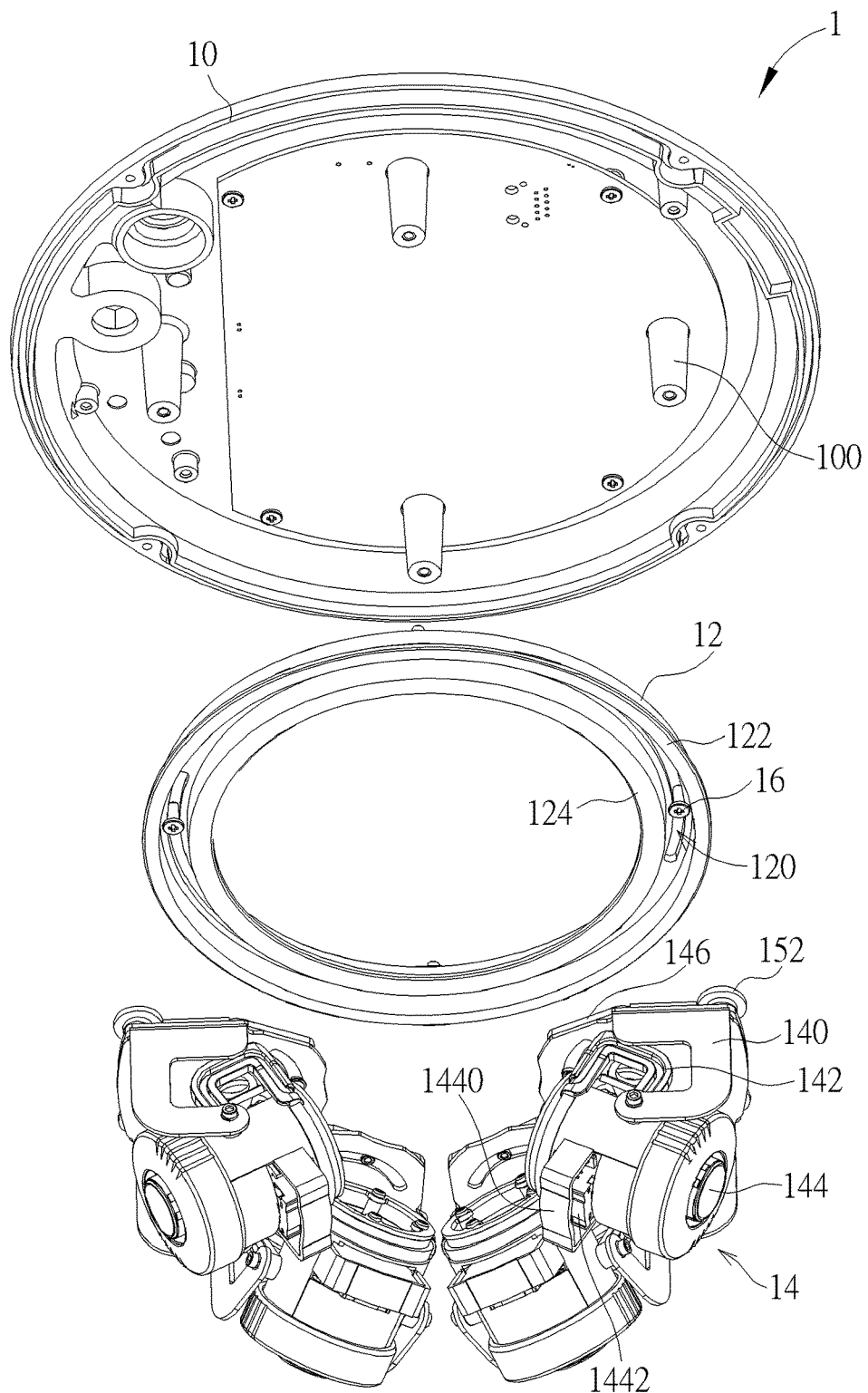
FIG. 3 is an exploded view illustrating the surveillance system shown in FIG. 1 from another viewing angle.
Figure 4:
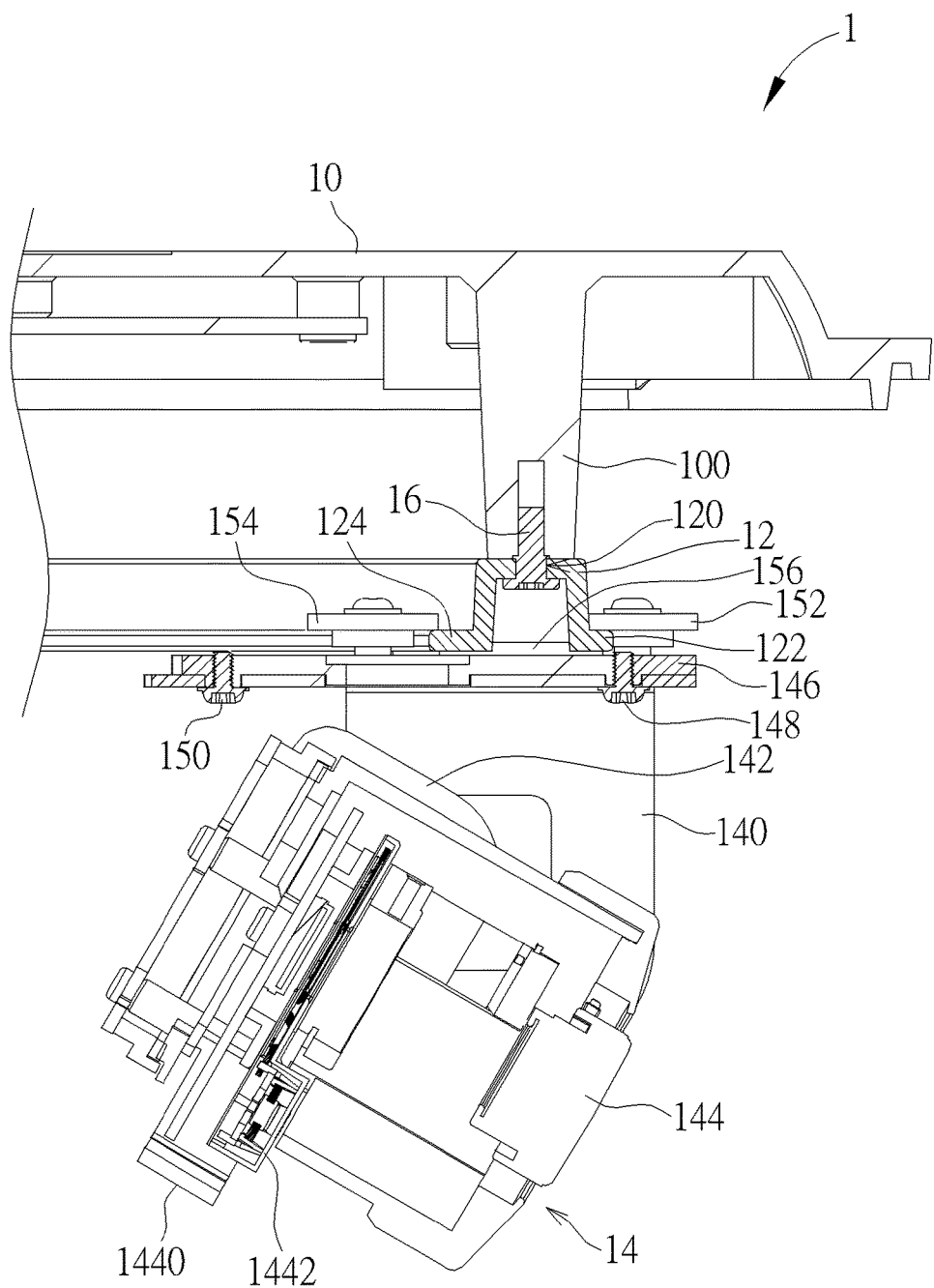
FIG. 4 is a sectional view illustrating parts of the surveillance system along line X-X shown in FIG. 1.
Figure 5:
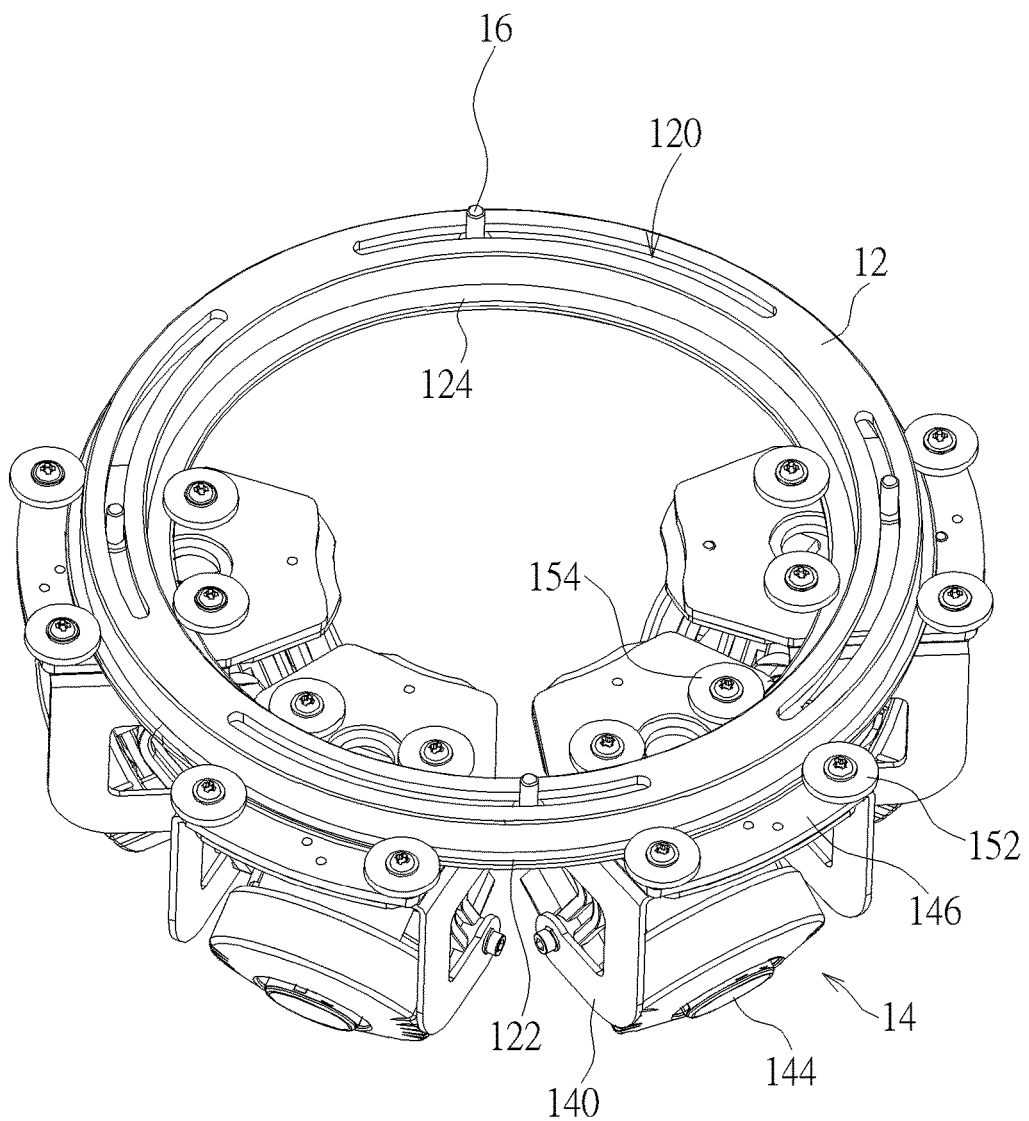
FIG. 5 is an assembly view illustrating the ring-shaped track and the surveillance device shown in FIG. 2.
Figure 6:
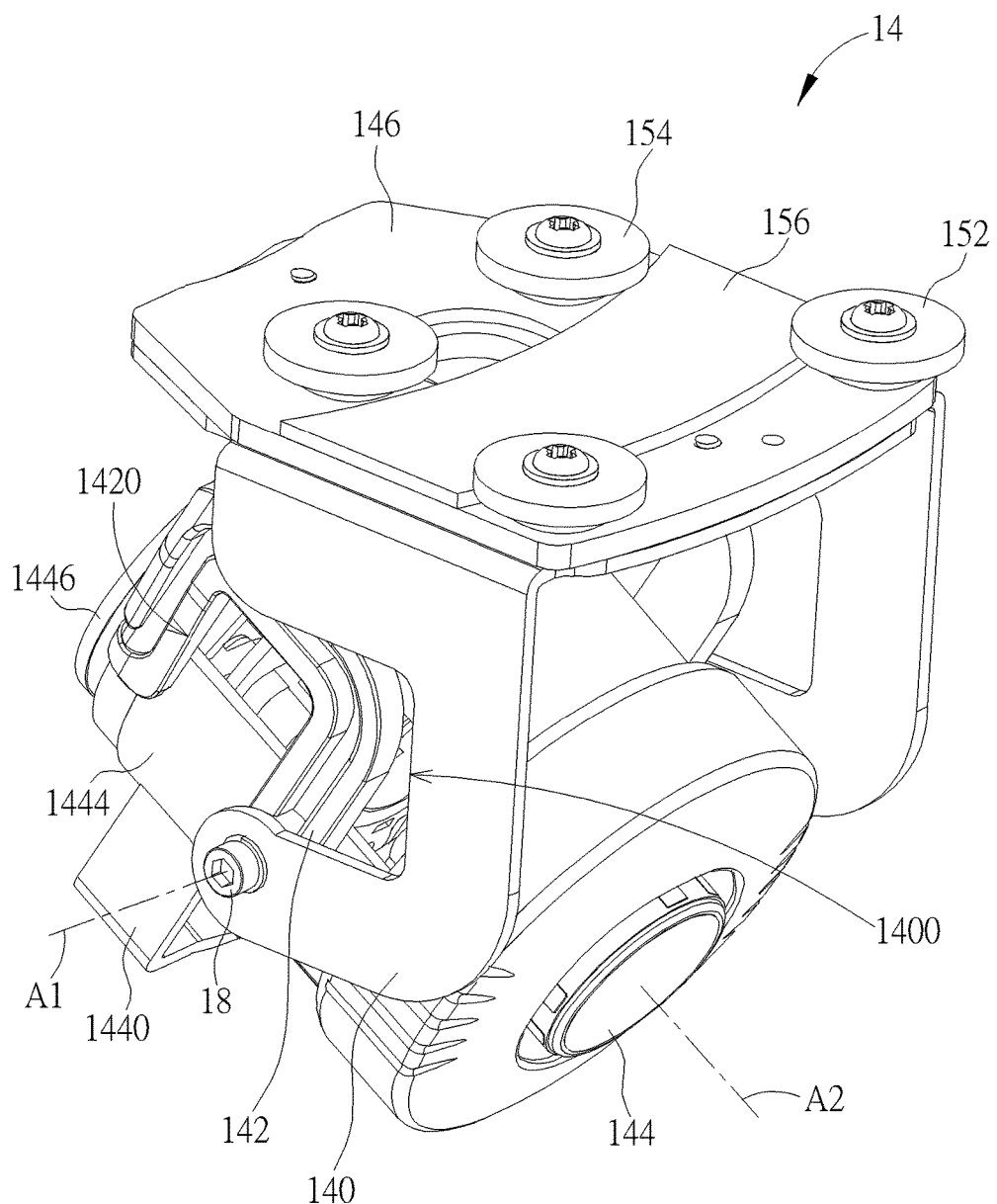
FIG. 6 is a perspective view illustrating the surveillance device shown in FIG. 1.
Figure 7:
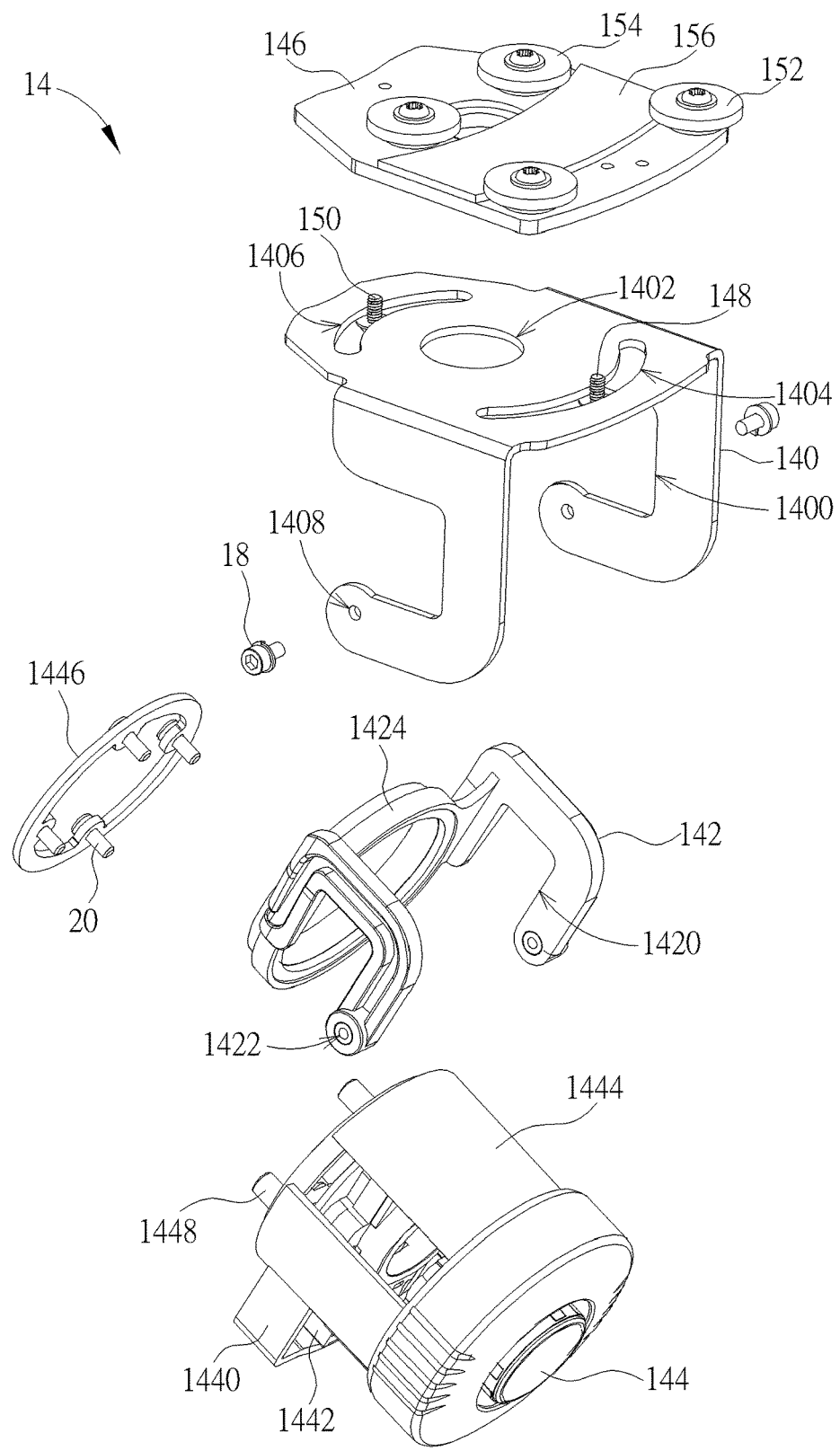
FIG. 7 is an exploded view illustrating the surveillance device shown in FIG. 6.
Figure 8:
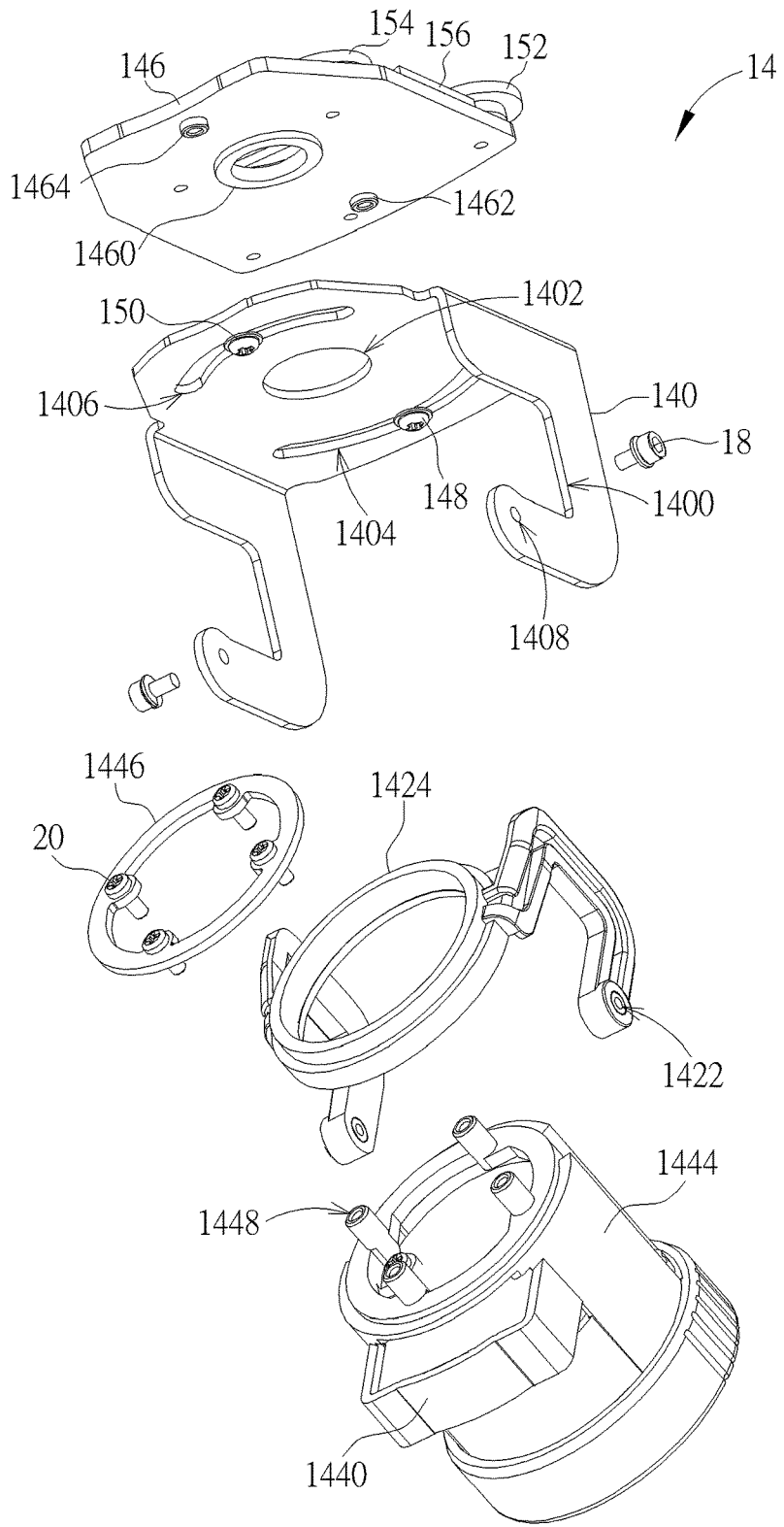
FIG. 8 is an exploded view illustrating the surveillance device shown in FIG. 6 from another viewing angle.
Figure 9:
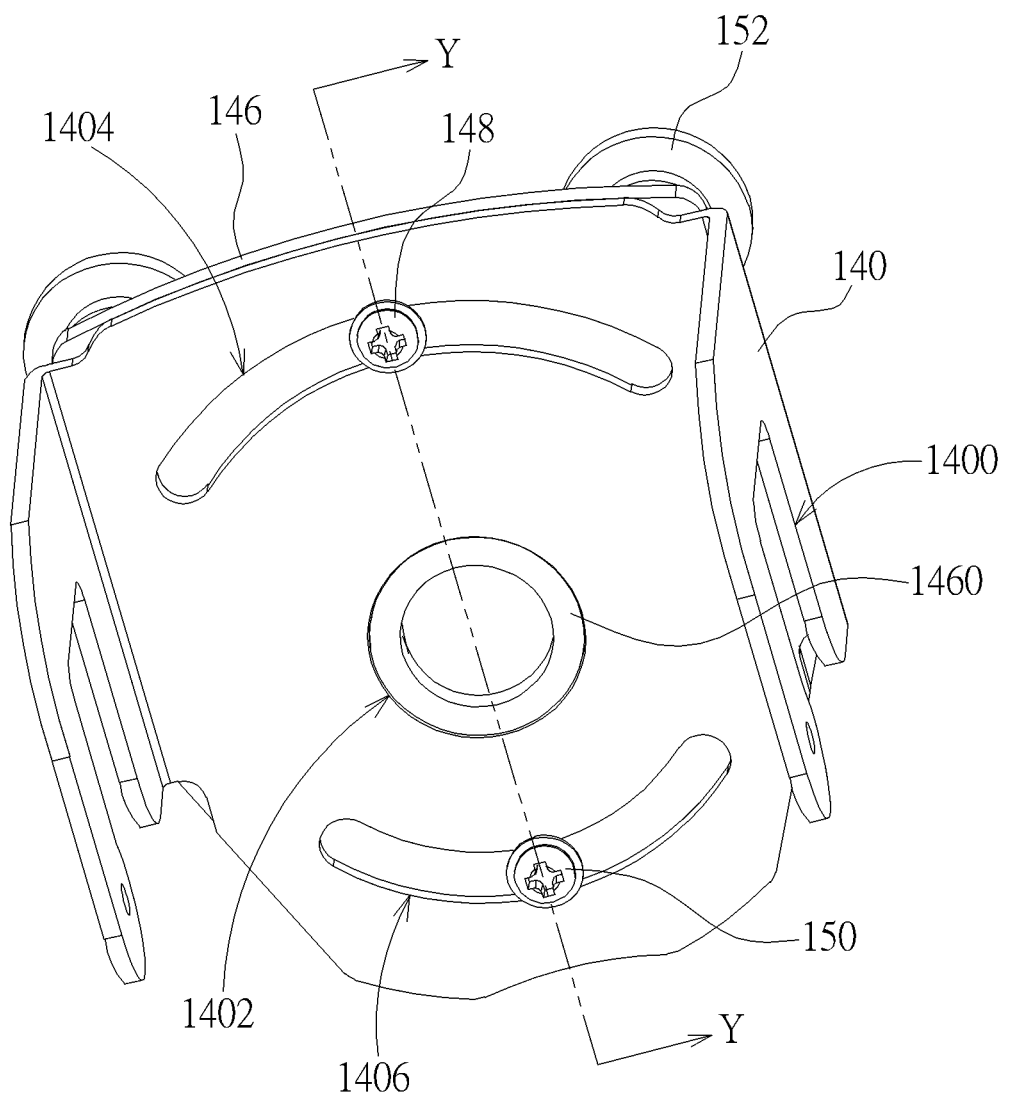
FIG. 9 is an assembly view illustrating the first support frame and the fixing frame shown in FIG. 8.

Referring to FIGS. 1 to 10, FIG. 1 is a perspective view illustrating a surveillance system 1 according to an embodiment of the invention, FIG. 2 is an exploded view illustrating the surveillance system 1 shown in FIG. 1, FIG. 3 is an exploded view illustrating the surveillance system 1 shown in FIG. 1 from another viewing angle, FIG. 4 is a sectional view illustrating parts of the surveillance system 1 along line X-X shown in FIG. 1, FIG. 5 is an assembly view illustrating the ring-shaped track 12 and the surveillance device 14 shown in FIG. 2, FIG. 6 is a perspective view illustrating the surveillance device 14 shown in FIG. 1, FIG. 7 is an exploded view illustrating the surveillance device 14 shown in FIG. 6, FIG. 8 is an exploded view illustrating the surveillance device 14 shown in FIG. 6 from another viewing angle, FIG. 9 is an assembly view illustrating the first support frame 140 and the fixing frame 146 shown in FIG.

Figure 10:
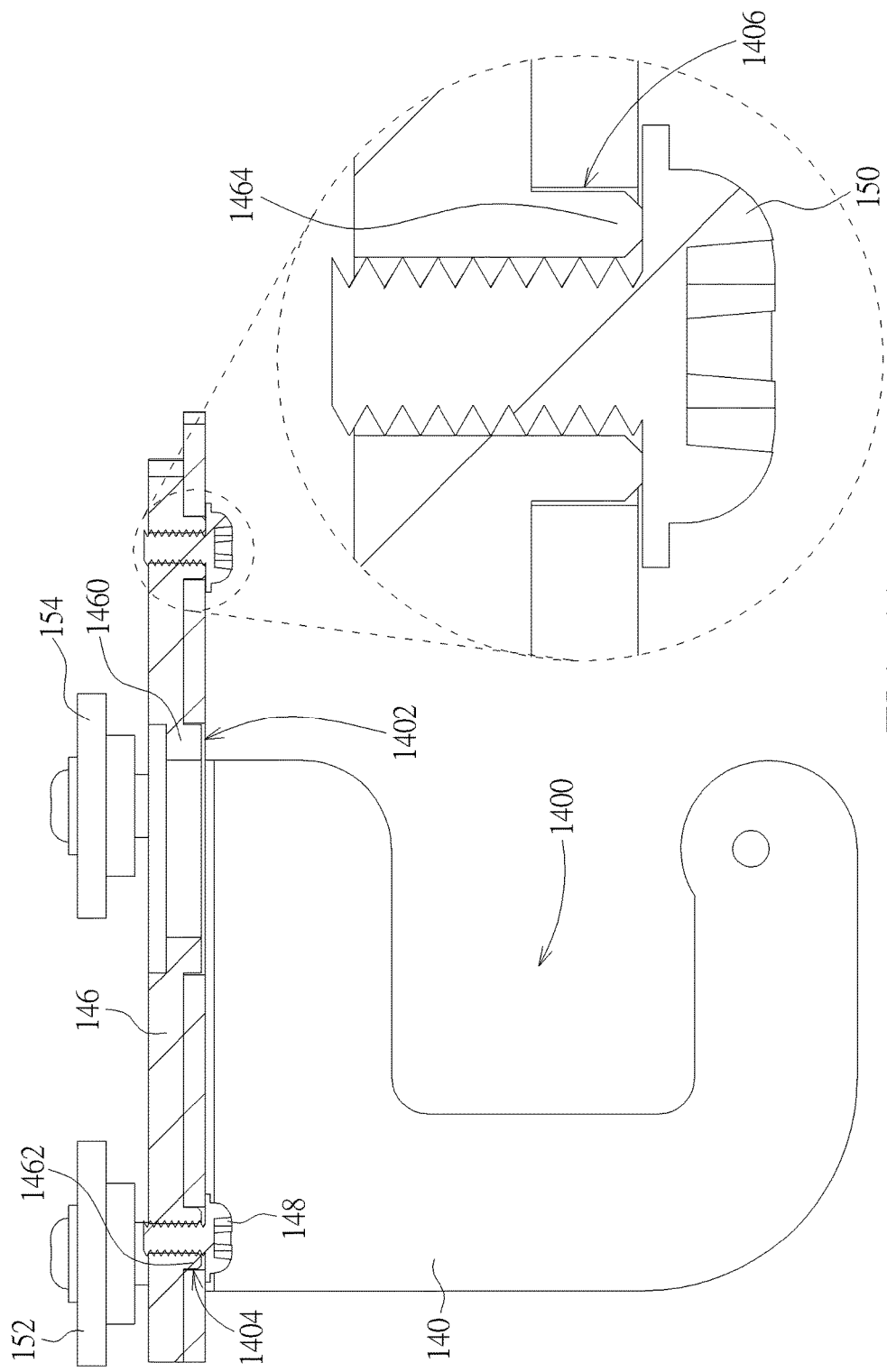
FIG. 10 is a sectional view illustrating the first support frame and the fixing frame along line Y-Y shown in FIG. 9.

8, and FIG. 10 is a sectional view illustrating the first support frame 140 and the fixing frame 146 along line Y-Y shown in FIG. 9.

As shown in FIGS. 1 to 4, the surveillance system 1 comprises a base 10, a ring-shaped track 12, a plurality of surveillance devices 14 and a plurality of fixing members 16. In this embodiment, the surveillance device 14 may be a camera or other image capturing devices. It should be noted that the number of the surveillance devices 14 may be one or more, so the invention is not limited to the embodiment shown in the figures. The ring-shaped track 12 has a plurality of through holes 120. The fixing members 16 can pass through the through holes 120 and be fixed on the fixing pillars 100 of the base 10. In this embodiment, the through hole 120 is a long and narrow hole. Accordingly, before the fixing member 16 are fixed on the fixing pillar 100 of the base 10 completely, the ring-shaped track 12 can rotate with respect to the base 10 within a length range of the through hole 120. In another embodiment, the through hole 120 may be a circular hole allowing the fixing member 16 to pass through only and it depends on practical applications. In this embodiment, the fixing member 16 may be, but not limited to, a screw.

As shown in FIGS. 6 to 8, the surveillance device 14 comprises a first support frame 140, a second support frame 142 and a lens module 144. Each of opposite sides of the first support frame 140 has a first recess structure 1400 and each of opposite sides of the second support frame 142 has a second recess structure 1420. The second support frame 142 is disposed on the first support frame 140 and configured to rotate with respect to a first axis A1. The lens module 144 is disposed on the second support frame 142 and configured to rotate with respect to a second axis A2. In other words, the lens module 144 is disposed on the first support frame 140 through the second support frame 142. In this embodiment, the first axis A1 is perpendicular to the second axis A2. The lens module 144 has a protruding structure 1440. In this embodiment, the lens module 144 has a control filter unit 1442 used for switching day and night modes. After miniaturizing the lens module 144, the control filter unit 1442 protrudes from a casing 1444 of the lens module 144. The protruding structure 1440 is used for covering and protecting the control filter unit 1442.

In this embodiment, a user may align the holes 1408 on opposite sides of the first support frame 140 with the holes 1422 on opposite sides of the second support frame 142, insert the fixing member 18 into the hole 1408 of the first support frame 140, and fix the fixing member 18 to the hole 1422 of the second support frame 142. Accordingly, the second support frame 142 is disposed on the first support frame 140 and can rotate with respect to the first axis A1. In this embodiment, the fixing member 18 may be, but not limited to, a screw. Furthermore, the hole 1422 of the second support frame 142 may be provided by a copper pillar embedded in the second support frame 142.

In this embodiment, the user may dispose the casing 1444 of the lens module 144 on a ring-shaped bracket 1424 of the second support frame 142, insert a fixing member 20 into a hole of a fixing plate 1446, and fix the fixing member 20 on a fixing pillar 1448 of the casing 1444, so as to fix the fixing plate 1446 on the casing 1444 of the lens module 144. At this time, the ring-shaped bracket 1424 of the second support frame 142 is sandwiched in between the casing 1444 of the lens module 144 and the fixing plate 1446. Accordingly, the lens module 144 is disposed on the second support frame 142 and can rotate with respect to the second axis A2. In this embodiment, the fixing member 20 may be, but not limited to, a screw.

Figure 11:
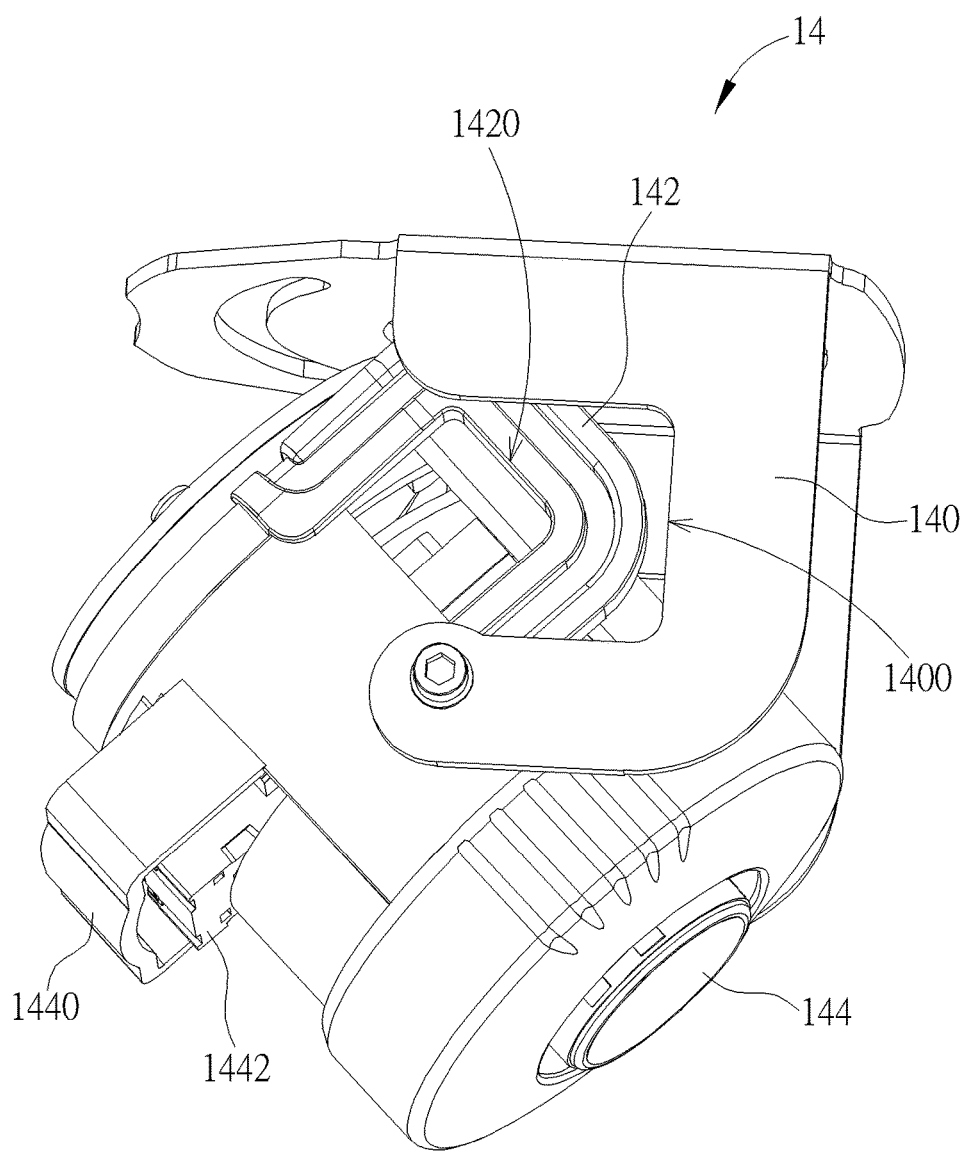
FIG. 11 is a perspective view illustrating the surveillance device shown in FIG. 6 from another viewing angle.
Figure 12:
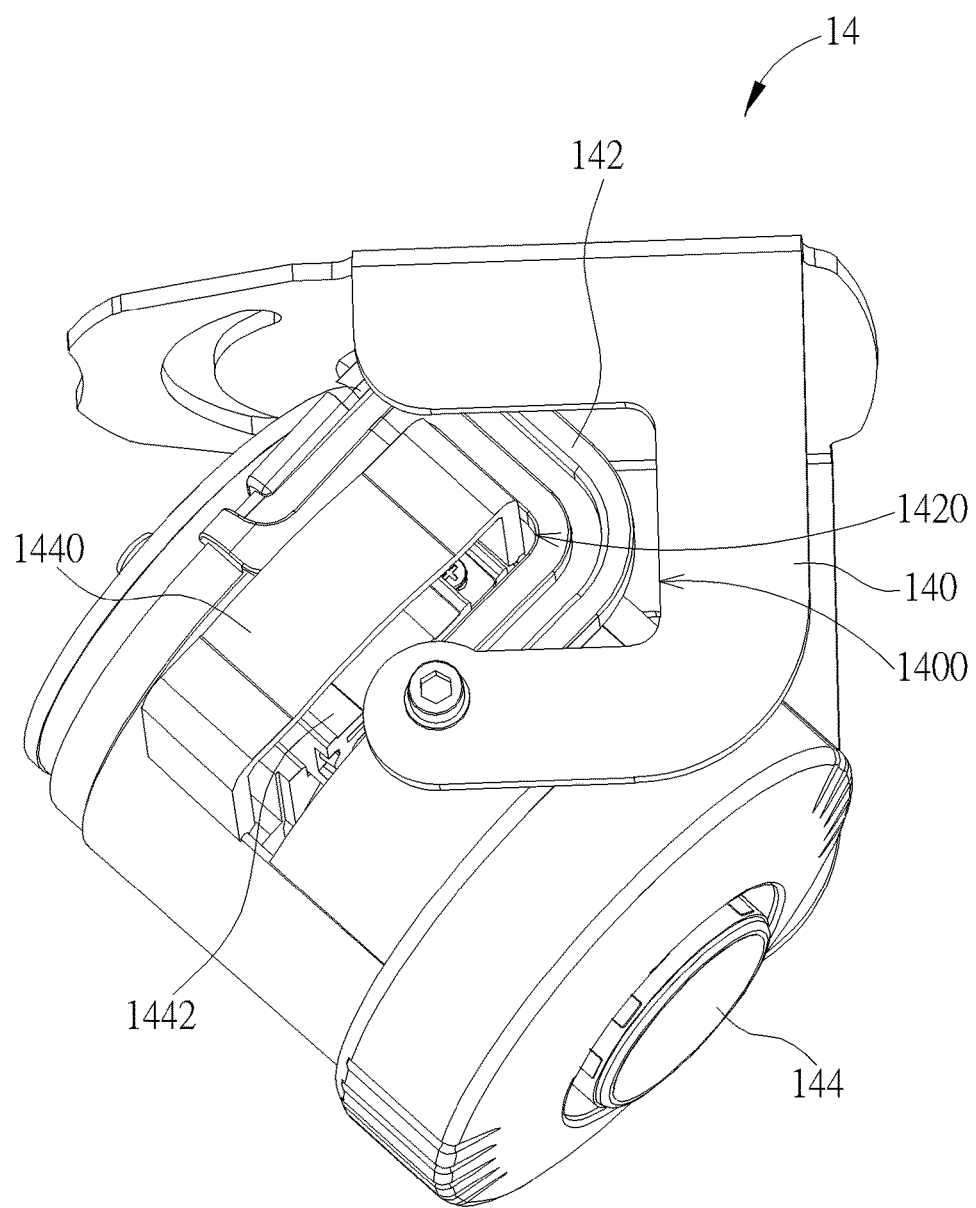
FIG. 12 is a perspective view illustrating the lens module shown in FIG. 11 after rotating with respect to the second axis.
Figure 13:
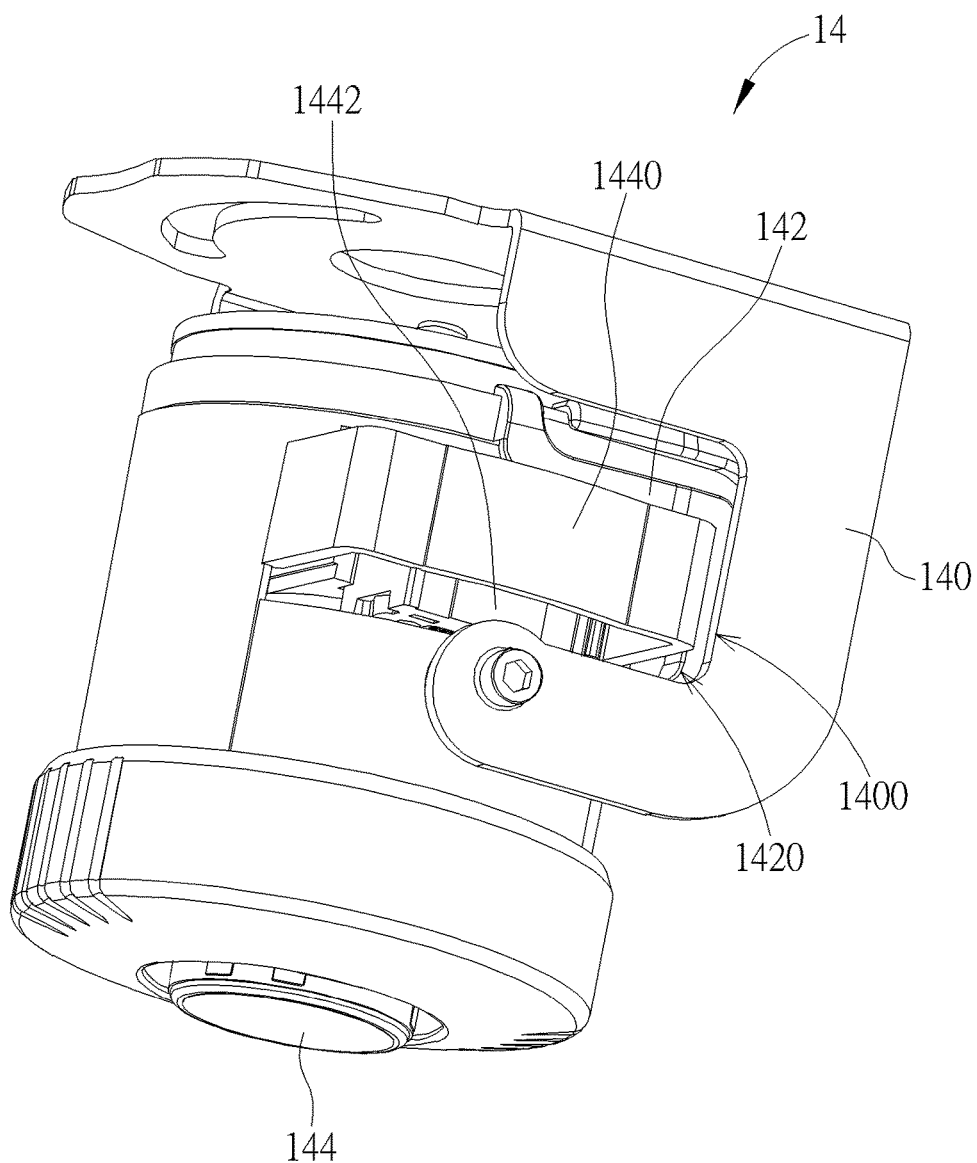
FIG. 13 is a perspective view illustrating the second support frame shown in FIG. 12 after rotating with respect to the first axis.
Figure 14:
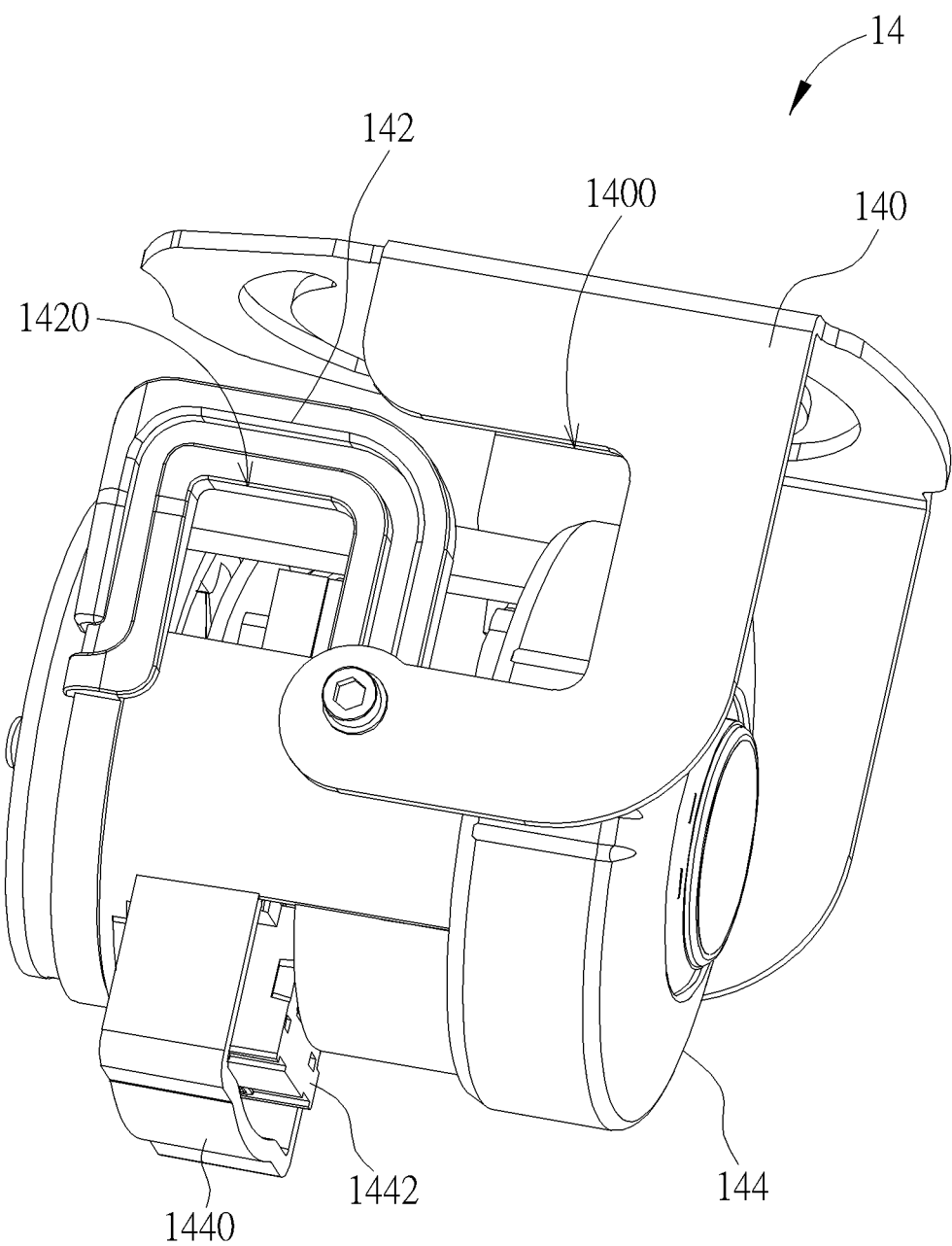
FIG. 14 is a perspective view illustrating the second support frame shown in FIG. 11 after rotating with respect to the first axis.
Figure 15:
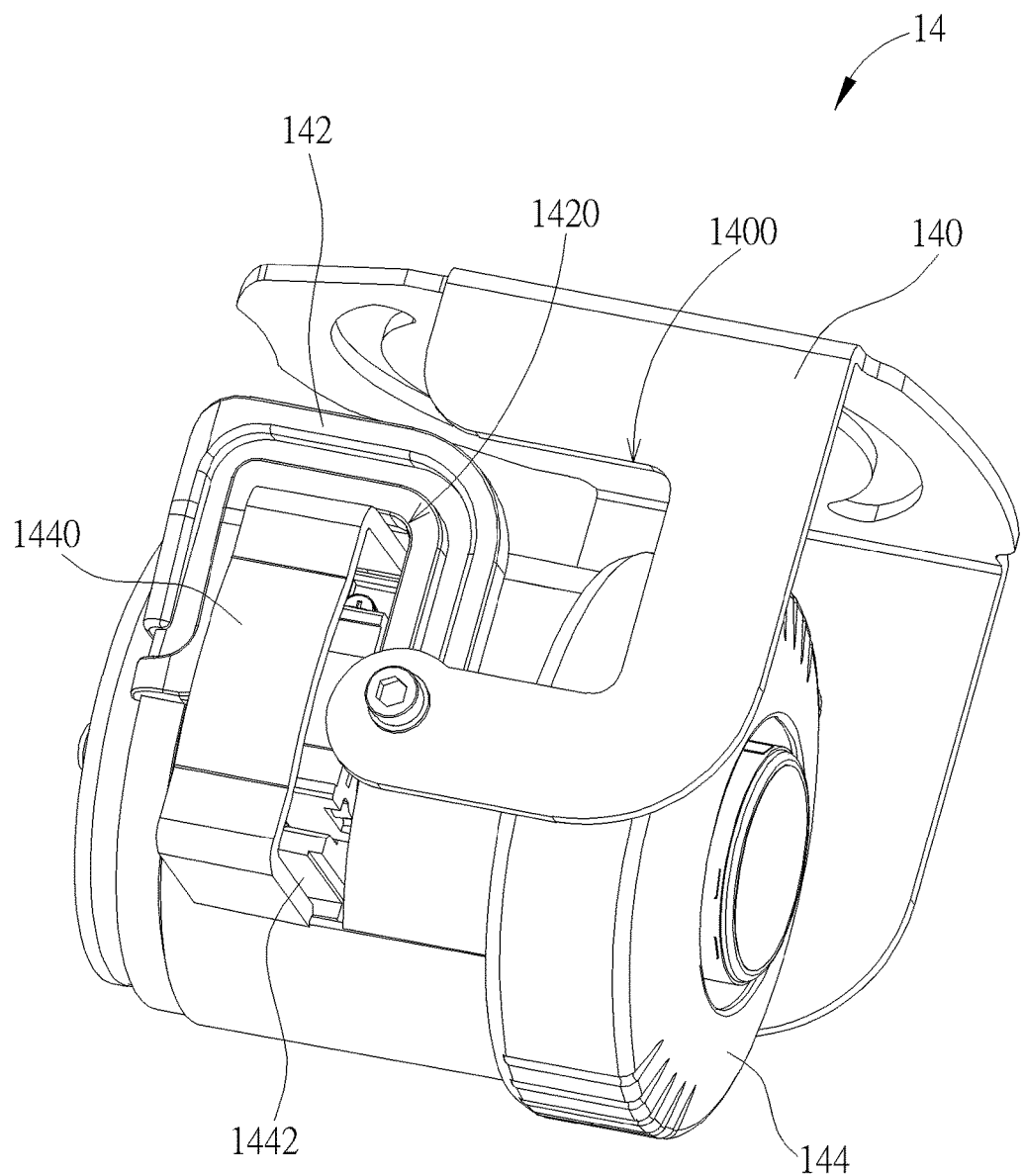
FIG. 15 is a perspective view illustrating the lens module shown in FIG. 14 after rotating with respect to the second axis.
Figure 16:
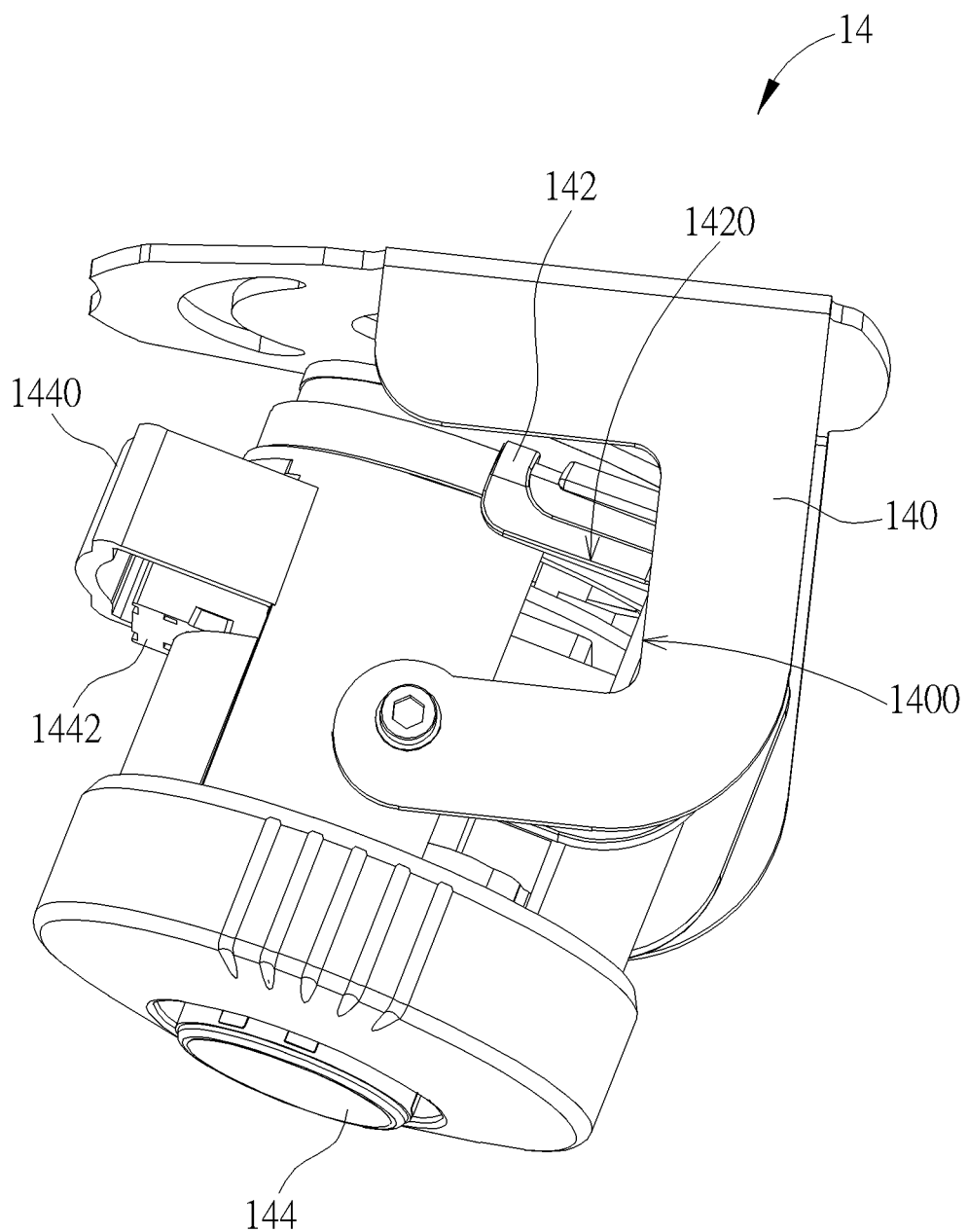
FIG. 16 is a perspective view illustrating the second support frame shown in FIG. 11 after rotating with respect to the first axis.

Referring to FIGS. 11 to 16, FIG. 11 is a perspective view illustrating the surveillance device 14 shown in FIG. 6 from another viewing angle, FIG. 12 is a perspective view illustrating the lens module 144 shown in FIG. 11 after rotating with respect to the second axis A2, FIG. 13 is a perspective view illustrating the second support frame 142 shown in FIG. 12 after rotating with respect to the first axis A1, FIG. 14 is a perspective view illustrating the second support frame 142 shown in FIG. 11 after rotating with respect to the first axis A1, FIG. 15 is a perspective view illustrating the lens module 144 shown in FIG. 14 after rotating with respect to the second axis A2, and FIG. 16 is a perspective view illustrating the second support frame 142 shown in FIG. 11 after rotating with respect to the first axis A1.

As shown in FIGS. 11 to 16, when the second support frame 142 or the lens module 144 rotates, the protruding structure 1440 can get in and out of the first recess structure 1400 of the first support frame 140 and the second recess structure 1420 of the second support frame 142. Accordingly, when the second support frame 142 or the lens module 144 rotates, the protruding structure 1440 will not interfere with the first support frame 140 and/or the second support frame 142. In this embodiment, the first recess structure 1400 and the second recess structure 1420 are, but not limited to, U-shaped.

As shown in FIGS. 6 to 8, the surveillance device 14 may further comprise a fixing frame 146, a first fixing member 148 and a second fixing member 150. The fixing frame 146 is disposed on the first support frame 140. In this embodiment, the first support frame 140 has a pivot hole 1402, a first guiding groove 1404 and a second guiding groove 1406, wherein the first guiding groove 1404 and the second guiding groove 1406 are located at opposite sides of the pivot hole 1402. The fixing frame 146 has a pivot shaft 1460, a first guiding pillar 1462 and a second guiding pillar 1464, wherein the first guiding pillar 1462 and the second guiding pillar 1464 are located at opposite sides of the pivot shaft 1460. As shown in FIGS. 9 and 10, the pivot shaft 1460 of the fixing frame 146 is pivotally connected to the pivot hole 1402 of the first support frame 140, the first guiding pillar 1462 of the fixing frame 146 is disposed in the first guiding groove 1404 of the first support frame 140, the first fixing member 148 is fixed on the first guiding pillar 1462 of the fixing frame 146, the second guiding pillar 1464 of the fixing frame 146 is disposed on the second guiding groove 1406 of the first support frame 140, and the second fixing member 150 is fixed on the second guiding pillar 1464 of the fixing frame 146. By means of the aforesaid mechanism, the first support frame 140 can rotate with respect to the fixing frame 146 within the first guiding groove and the second guiding groove, so as to drive the lens module to rotate.

In this embodiment, a height of the first guiding pillar 1462 may be slightly smaller than a thickness of the first guiding groove 1404 and a height of the second guiding pillar 1464 may be slightly larger than a thickness of the second guiding groove 1406. Accordingly, as shown in FIG. 10, when the fixing frame 146 is disposed on the first support frame 140, the first guiding pillar 1462 sinks into the first guiding groove 1404 and the second guiding pillar 1464 protrudes from the second guiding groove 1406. When the first fixing member 148 is fixed on the first guiding pillar 1462 tightly, a head of the first fixing member 148 will abut against the first support frame 140 tightly to fix the first support frame 140 and the fixing frame 146. At this time, the first support frame 140 cannot rotate with respect to the fixing frame 146. Furthermore, when the second fixing member 150 is fixed on the second guiding pillar 1464 tightly, a head of the second fixing member 150 will abut against the second guiding pillar 1464 without contacting the first support frame 140. Accordingly, as long as the user looses the first fixing member 148 from the first guiding pillar 1462, the first support frame 140 can rotate with respect to the fixing frame 146. After the first support frame 140 rotates with respect to the fixing frame 146, the first support frame 140 and the fixing frame 146 can be fixed as long as the user fixes the first fixing member 148 on the first guiding pillar 1462 tightly. In this embodiment, the first fixing member 148 and the second fixing member 150 may be screws.

It should be noted that, in another embodiment, the first support frame 140 may only have the pivot hole 1402 and the first guiding groove 1404, and the fixing frame 146 may only have the pivot shaft 1460 and the first guiding pillar 1462. Furthermore, in another embodiment, the first support frame 140 may only have the first guiding groove 1404 and the second guiding groove 1406, and the fixing frame 146 may only have the first guiding pillar 1462 and the second guiding pillar 1464.

As shown in FIG. 6, the surveillance device 14 may further comprise at least one first roller 152, at least one second roller 154 and at least one damping member 156. In this embodiment, the surveillance device 14 comprises two first rollers 152 and two second rollers 154. However, the number of the first rollers 152 and the number of the second rollers 154 may be one or more, so the invention is not limited to the embodiment shown in the figures. The first rollers 152 and the second rollers 154 are disposed on the fixing frame 146 and the fixing frame 146 is disposed on the first support frame 140. In other words, the first rollers 152 and the second rollers 154 are disposed on the first support frame 140 through the fixing frame 146. The damping member 156 is disposed on the fixing frame 146. In this embodiment, the damping member 156 may be elastic sponge or other elastic materials. In another embodiment, the damping member 156 may be a combination of elastic material and mylar or a combination of elastic material and Teflon.

Still further, the ring-shaped track 12 has an outside flanged portion 122 and an inside flanged portion 124. As shown in FIGS. 4 and 5, the first roller 152 leans against the outside flanged portion 152 and the second roller 154 leans against the inside flanged portion 154, such that the ring-shaped track 12 is sandwiched in between the first roller 152 and the second roller 154. Accordingly, the surveillance device 14 can be hanged on the ring-shaped track 12 and move along the ring-shaped track 12 by the first roller 152 and the second roller 154. When the surveillance device 14 is hanged on the ring-shaped track 12, the damping member 156 is sandwiched in between the ring-shaped track 12 and the fixing frame 146, as shown in FIG. 4. The damping member 156 can provide frictional damping effect, such that the surveillance device 14 will not move with respect to the ring-shaped track 12 in a static state. When the user exerts a force over the frictional damping effect provided by the damping member 156, the surveillance device 14 can move along the ring-shaped track 12 accordingly.

As mentioned in the above, the first support frame can move along the ring-shaped track by the first roller and the second roller, such that the lens module moves with the first support frame along the ring-shaped track. Furthermore, the second support frame can rotate with respect to the first support frame, such that the lens module rotates with the second support frame with respect to the first support frame. Moreover, the lens module can rotate with respect to the second support frame. Still further, the first support frame can rotate with respect to the fixing frame, such that the lens module rotates with the first support frame. By means of the aforesaid mechanism, a user can adjust the lens orientation conveniently and rapidly to satisfy different requirements of surveillance orientations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A surveillance system comprising:
a ring-shaped track having an outside flanged portion and an inside flanged portion;
a first support frame;
at least one first roller disposed on the first support frame and leaning against the outside flanged portion;
at least one second roller disposed on the first support frame and leaning against the inside flanged portion, such that the ring-shaped track is sandwiched in between the at least one first roller and the at least one second roller; and
a lens module disposed on the first support frame.

2. The surveillance system of claim 1, further comprising a base and a plurality of fixing members, the ring-shaped track having a plurality of through holes, the fixing members passing through the through holes and being fixed on the base.

3. The surveillance system of claim 1, further comprising a second support frame disposed on the first support frame and configured to rotate with respect to a first axis, the lens module being disposed on the second support frame and configured to rotate with respect to a second axis, the first axis being perpendicular to the second axis.

4. The surveillance system of claim 3, wherein the lens module has a protruding structure, the first support frame has a first recess structure, the second support frame has a second recess structure, and the protruding structure is configured to get in and out of the first recess structure and the second recess structure when the second support frame or the lens module rotates.

5. The surveillance system of claim 1, further comprising a fixing frame and a damping member, the fixing frame being disposed on the first support frame, the at least one first roller and the at least one second roller being disposed on the fixing frame, the damping member being sandwiched in between the ring-shaped track and the fixing frame.

6. The surveillance system of claim 1, further comprising a fixing frame and a first fixing member, the fixing frame being disposed on the first support frame, the at least one first roller and the at least one second roller being disposed on the fixing frame, the first support frame having a pivot hole and a first guiding groove, the fixing frame having a pivot shaft and a first guiding pillar, the pivot shaft being pivotally connected to the pivot hole, the first guiding pillar being disposed in the first guiding groove, the first fixing member being fixed on the first guiding pillar.

7. The surveillance system of claim 6, further comprising a second fixing member, the first support frame further having a second guiding groove, the first guiding groove and the second guiding groove being located at opposite sides of the pivot hole, the fixing frame further having a second guiding pillar, the first guiding pillar and the second guiding pillar being located at opposite sides of the pivot shaft, the second guiding pillar being disposed in the second guiding groove, the second fixing member being fixed on the second guiding pillar.

8. The surveillance system of claim 1, further comprising a fixing frame, a first fixing member and a second fixing member, the fixing frame being disposed on the first support frame, the at least one first roller and the at least one second roller being disposed on the fixing frame, the first support frame having a first guiding groove and a second guiding groove, the fixing frame having a first guiding pillar and a second guiding pillar, the first guiding pillar being disposed in the first guiding groove, the second guiding pillar being disposed in the second guiding groove, the first fixing member being fixed on the first guiding pillar, the second fixing member being fixed on the second guiding pillar.

9. A surveillance device comprising:
a first support frame having a first recess structure;
a second support frame disposed on the first support frame and configured to rotate with respect to a first axis, the second support frame having a second recess structure; and
a lens module disposed on the second support frame and configured to rotate with respect to a second axis, the first axis being perpendicular to the second axis, the lens module having a protruding structure, the protruding structure being configured to get in and out of the first recess structure and the second recess structure when the second support frame or the lens module rotates.

10. The surveillance device of claim 9, further comprising a fixing frame and a first fixing member, the fixing frame being disposed on the first support frame, the first support frame having a pivot hole and a first guiding groove, the fixing frame having a pivot shaft and a first guiding pillar, the pivot shaft being pivotally connected to the pivot hole, the first guiding pillar being disposed in the first guiding groove, the first fixing member being fixed on the first guiding pillar.

11. The surveillance device of claim 10, further comprising a second fixing member, the first support frame further having a second guiding groove, the first guiding groove and the second guiding groove being located at opposite sides of the pivot hole, the fixing frame further having a second guiding pillar, the first guiding pillar and the second guiding pillar being located at opposite sides of the pivot shaft, the second guiding pillar being disposed in the second guiding groove, the second fixing member being fixed on the second guiding pillar.

12. The surveillance device of claim 9, further comprising a fixing frame, a first fixing member and a second fixing member, the fixing frame being disposed on the first support frame, the first support frame having a first guiding groove and a second guiding groove, the fixing frame having a first guiding pillar and a second guiding pillar, the first guiding pillar being disposed in the first guiding groove, the second guiding pillar being disposed in the second guiding groove, the first fixing member being fixed on the first guiding pillar, the second fixing member being fixed on the second guiding pillar.

* * * * *